June 21, 1927.
E. F. GOELLER
BATTERY TERMINAL CONNECTER
Filed Dec. 22, 1925
1,633,176
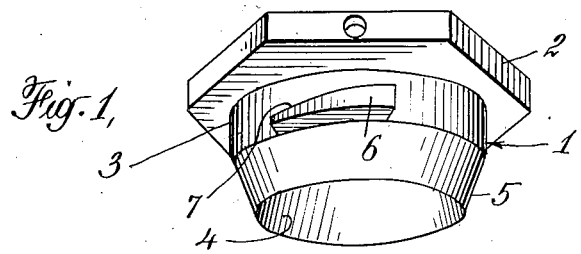
Fig. 1,
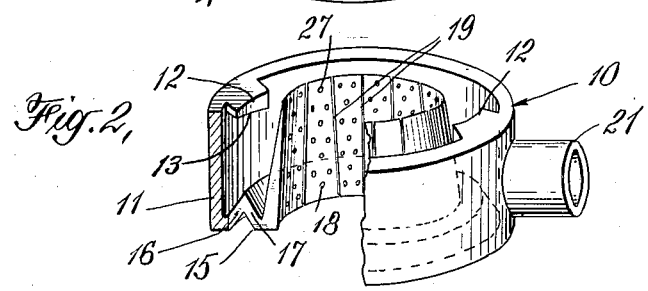
Fig. 2,
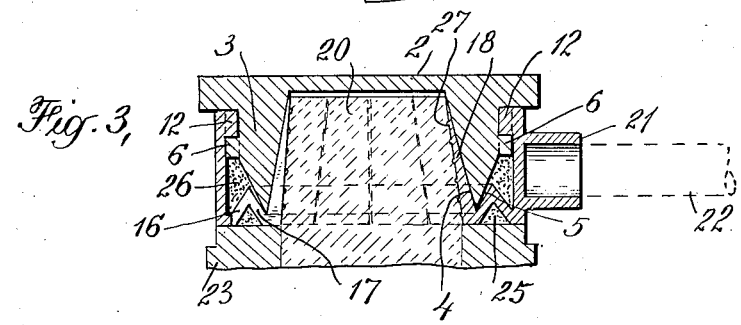
Fig. 3,
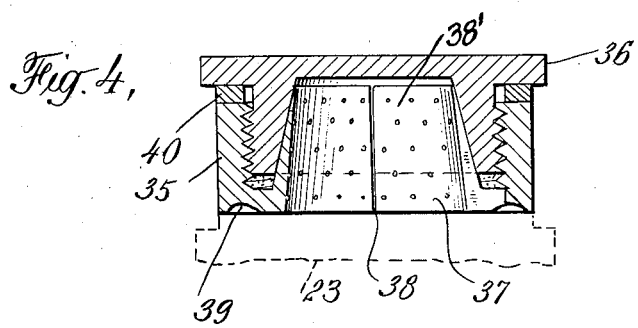
Fig. 4,
INVENTOR
Edward Ford Goeller
BY
ATTORNEYS Patented June 21, 1927.

1,633,176

UNITED STATES PATENT OFFICE.

EDWARD FORD GOELLER, OF NEW YORK, N. Y.

BATTERY-TERMINAL CONNECTER.

Application filed December 22, 1925. Serial No. 76,949.

This invention relates to detachable battery terminals or connecters by means of which electrical conductors are connected to the fixed terminals of a battery, as for instance a storage battery, and the invention has to do more particularly with the provision of an improved type of detachable connecter which is quickly and easily put in position and detached and which also contains provision for preventing the leakage of the electrolyte and the acid fumes therefrom around the battery terminal.

The terminals of storage batteries ordinarily consist of a lug which extends up above the top of the battery and is connected to the plates which lie beneath the surface of the electrolyte. This lug has no provision for connecting the electrical conductor to it and detachable terminals or connecters are provided for the purpose. Owing to the manner in which the lug projects through the cover of the battery, acid fumes from the electrolyte escape around the terminal and leakage of the electrolyte frequently occurs around the top especially when the battery is subjected to shock, and as the electrolyte contains free acid, this quickly corrodes the metal parts not only doing injury to these parts but also in some instances preventing a good contact being made between the conductor and the terminal.

The present invention is intended to provide a simple quickly detachable terminal connecter in which provision is made for preventing leakage of the electrolyte or the acid fumes at the base of the lug which extends upwardly above the battery cover. This connecter consists of a pair of co-acting members adapted to be placed over the projecting lug and when in co-operative relation to grip this lug firmly. These members or parts of the terminal are constructed to provide a chamber between them at or near the base of the terminal in which a quantity of non-permeable material unaffected by the electrolyte may be placed and in the operation of assembling these parts this material is forced through appropriate passages and establishes a seal by which the escape of electrolyte or fumes from the interior of the cell is prevented. One of the members may be provided with a suitable socket in which the end of an electrical connecter such as a copper cable, may be secured in any convenient manner as by a soldering operation.

In the accompanying drawings there is shown one form of the invention which is considered satisfactory and in these drawings:

Fig. 1 is a perspective of one of the members of the connecter.

Fig. 2 is a perspective view, with parts broken away, of the lower or gripping member of the connecter.

Fig. 3 is a sectional view showing the two connecter parts in locked position and gripping a battery terminal.

Fig. 4 is a sectional view showing a modified form of my invention.

Referring to the drawings, in Fig. 1 is shown the cap member 1 of the new terminal and the member which cooperates therewith is shown in Fig. 2. The cap member is preferably provided with an enclosing top 2 which may be of any desired shape and which preferably covers the top of the battery terminal when the connecter is applied to the terminal, as best shown in Fig. 3. Extending downwardly from the top 2 is an annulus 3. The inner walls 4 of the annulus 3 are preferably divergent downwardly for the purpose of co-acting with the lower member to cause the lower member to grip the battery terminal. The outer walls of the annulus 3 may extend downwardly at substantially right angles to the top member 2 for a distance, and then are directed inwardly as at 5. The member 1 is provided with lugs 6, any suitable number of which may be provided. Two of such lugs are ordinarily sufficient, as shown, but more can be provided if desirable. The lugs or projections 6 are provided with a slanting upper surface 7 which slanting surface co-operates with the projections on the contacting member to lock the two parts together as will presently appear.

The connecting or ring member 10 is preferably of circular form and is preferably provided with a solid outer wall 11. This wall 11 is provided with lugs or projections 12, having slanting lower surfaces 13 for co-operating with the slanting surfaces 7 of the lugs 6 on the cap member 1. It will be understood that the number and position of the lugs 12 correspond to the number and position of the lugs 6. The base of the wall 11 has inwardly directed tines 15. The tines 15 extend upwardly at an angle as shown at 16 and then are directed downwardly as at 17, and then are directed upwardly to form spring-like gripping members 18. The members 18 are preferably gradually reduced in thickness as best shown in Figure 2 which aids the spring-like gripping action of the members 18 upon the battery terminal 20, and which also aids in giving the socket formed by the tines a conical shape. The members 18 may be provided with small projections or teeth 27 which bite into the post 20, but which do not materially disfigure the surfaces of the post. The tines 15 are spaced apart by slots 19, which slots 19 extend to the outer wall 11 and space the portions 16 and 17 of the tines. The member 10 may be provided with a suitable device such as the socket 21 for connection with an electrical conductor 22. The connection between the device 21 and electrical conductor 22 may be made in any desirable way, as by soldering or by sweating the member 21 onto the conductor 22. As best shown in Fig. 3, when the two parts of the connecter are secured to the battery terminal the member 10 may rest upon the surface 23 of the battery. The angular portions 16 and 17 co-operating with the cover 23 of the battery form an annular recess 25. In some constructions, a nut is secured to the post 20 to hold the post and the depending plates in position, and in this case the connecter co-operates with such nut, instead of the cover or top of the battery, to form the annular recess. Also an annular recess 26 lies between the wall 11 and the annulus 3 of the member 1.

The ring member 10 of the connecter is adapted to receive a non-permeable substance preferably in the nature of a lubricant between the outer wall 11 and the upstanding portions 18 of the tines 15. The lubricant may be placed into the member 10 in preparation to the securing of the connecter onto the battery terminal 20. In securing the connecter onto the battery terminal the member 10 is placed upon the terminal and the portions 18 of the tines 15 contact with the terminal and make electrical contact therewith. The cap member 1 is then placed above the gripping member 10 and is forced downwardly. In the downward movement of the cap member 1 the inclined surface 4 of the interior of the annulus 3 acts upon the conical shaped socket and compresses the members 18 against the terminal 20 thus making a secure electrical contact. Also the downward movement of the member 1 displaces the lubricant which lies between the wall 11 and the portions 18, and forces the lubricant through the slots 19 and into the annular recess 25. At the same time the lubricant is forced into all of the slots 19 between upstanding portions 18 and the lubricant also fills the annular space 26. The cap member 1 is then given a turn and the lugs 6 catch under the lugs 12 of the contacting member. By reason of the co-operating inclined surfaces of the lugs, this turning of the cap member gives a final downward movement, and causes the spring-like socket to firmly grip the battery terminal.

Thus it will be seen that the non-permeable substance which fills the annular recess 25 and the chamber 26 forms a seal which extends entirely around the battery terminal and the leakage of the electrolyte, and the passage of the acid fumes is prevented.

In Fig. 4, I show a modified form of my invention. In this form the wall 35 of the contacting member is provided with internal threads and the depending annulus of the cap member 36 is provided with external threads. The member 35 in this form may also be provided with spring contacting members 37 which are separated by slots 38 which slots extend to the wall 35 and the tines 38' are shaped to provide a circular recess 39. In this form the member 35 is filled with lubricant and the top 36 is screwed into the member 35, compressing the members 37 against the battery terminal and forcing the lubricant between the spring contacting members 37 and into the annular recess 39. If desired, a suitable washer 40, which may be of lead, may be inserted between the members 35 and 36. It will be understood that the member 35 may also be provided with a desirable device for connecting the member to the electrical conductor.

It will be noted that in the preferred form of the invention as shown in Figs. 1 to 3 the parts are constructed so that the contacting portions 18 contact with the battery terminal throughout the length of the terminal and that the depending annulus 3 of the cap member 1 is designed to extend to the lower most parts of the members 18 and compress the members against the terminal throughout their entire length. This construction affords a firm gripping action on the battery terminal, which extends from the very base of the terminal.

For the purpose of making clear my invention I selected the form of the device as shown in the drawings. It will be understood, however, that the various details of the arrangement shown and described may be changed without departing from the invention or sacrificing any of the advantages thereof.

I claim:

1. A connector for mounting on a battery terminal which comprises the combination of a ring member adapted to be fitted over the terminal, and having a portion adapted to engage the terminal, a cap member cooperating with the ring to lock the latter to the terminal, a chamber formed between the cap and ring for holding a quantity of non-permeable material, and an outlet from the chamber through which the non-permeable material may pass to form a seal around the base of the terminal when the connecter is in place thereon.

2. A connecter for mounting on a battery terminal which comprises the combination of a ring adapted to be fitted over the terminal, a cap co-operating with the ring to lock the latter to the terminal, a chamber formed between the cap and the ring for holding a quantity of non-permeable material, and outlets from the chamber through which the non-permeable material may be forced to provide a seal around the base of the terminal when the parts are assembled.

3. A connecter for mounting on a battery terminal which comprises the combination of a ring adapted to be fitted over the terminal and having resilient portions in contact with the latter, a cap having a portion arranged to bear against the resilient portions of the ring to cause them to grip the terminal, a chamber defined in part by the ring and in part by the cap when the two are in assembled relation for receiving a non-permeable material, outlets from the chamber through which the non-permeable material may be forced to provide a seal around the base of the terminal when the parts are assembled, and interengaging means for holding the ring and cap in assembled position.

4. A connecter for a battery terminal comprising a contacting member having an outer wall, an inner wall spaced from the outer wall and said inner wall providing a resilient socket to receive the battery terminal, a locking member having a portion adapted to be received in the space between the inner and outer walls and adapted to compress the walls of the resilient socket and cause said walls to grip the said terminal.

5. A connecter for a battery terminal comprising a resilient socket to receive the battery terminal, said resilient socket having an exterior surface of conical form, a locking member provided with a recess having diverging walls and adapted to enclose said resilient socket, said locking member adapted to be secured in locking position by a movement toward the resilient socket, whereby the walls of the resilient socket are collapsed and caused to grip the battery terminal.

6. A connecter for a battery terminal comprising a contacting member having an outer wall, tines projecting inwardly and then upwardly from the bottom portion of said wall to form a socket having a resilient wall spaced from said outer wall, said socket adapted to receive the terminal of a battery, a locking member having a portion adapted to be fitted into the space between the outer wall and said socket wall to collapse the socket wall and cause it to grip the battery terminal, and co-operating lugs on said locking member and on the outer walls of said contacting member to hold the locking member in locked position.

7. In a connecter for a battery terminal, a contacting member comprising an outer wall, inner walls forming a socket to receive the battery terminal, said inner and outer walls being spaced apart and a connecting portion between said inner and outer walls, said connecting portion being positioned adjacent the cover of the battery and shaped to form a circumferential chamber, a locking member having a portion extending into the space between the outer and inner walls and forcing the inner walls to grip the said terminal, and a non-permeable substance in said circumferential chamber and in said space between the outer and inner walls.

8. A connecter for mounting on a battery terminal which comprises the combination of a ring member having a flexible cylindrical portion adapted to be fitted over the terminal, a cap member cooperating with the ring and operable to force the said flexible portion into gripping engagement with the terminal, a chamber formed between the cap and ring for holding a sealing material, an outlet from the chamber with an opening near the base of the ring member, and interengaging means for holding the ring and cap in assembled relation.

In testimony whereof I affix my signature.

EDWARD FORD GOELLER.